C. HUNNICUTT.
SEED CORN GRADER.
APPLICATION FILED APR. 26, 1911.

1,009,069.

Patented Nov. 21, 1911.

WITNESSES

INVENTOR.
Charles Hunnicutt

UNITED STATES PATENT OFFICE.

CHARLES HUNNICUTT, OF WILMINGTON, OHIO.

SEED-CORN GRADER.

1,009,069. Specification of Letters Patent. Patented Nov. 21, 1911.

Application filed April 26, 1911. Serial No. 623,397.

*To all whom it may concern:*

Be it known that I, CHARLES HUNNICUTT, a citizen of the United States, residing at Wilmington, in the county of Clinton and State of Ohio, have invented a new and useful Improvement in Seed-Corn Graders, of which the following is a specification.

My invention relates to seed corn graders of the hand-operable type, and the object of the same is to produce a device that will readily separate from a mass of kernels of corn those kernels that do not conform in size and shape to the size and shape of the cells in the dropping mechanism of corn planting machines, or in other words, that will grade kernels of seed corn as to thickness and as to width, eliminating the smaller, thinner, and abnormally large or irregular shaped kernels from the larger symmetrical ones, which latter are more desirable for planting and reproduction, besides being adapted to be dropped far more uniformly by planting machines than is possible with ungraded corn.

A further object of my invention is to produce a simple and efficient means whereby the separating and grading of the corn is accomplished with a single screen having a comparatively shallow hopper-like frame, the whole being constructed of a size adapted to be conveniently operated by hand, a portion of the screen being provided with fine apertures and another portion of the screen being provided with coarse apertures, the two compartments of the screen being separated by a partition or the like which is so arranged as to retain the corn on one of the compartments of the screen, and is adapted to be raised or opened to permit the passage of the corn to the other compartment of the screen at the will of the operator.

Other objects and particular advantages of this invention will be clearly brought out or suggested in the course of the ensuing specification.

Figure 1:
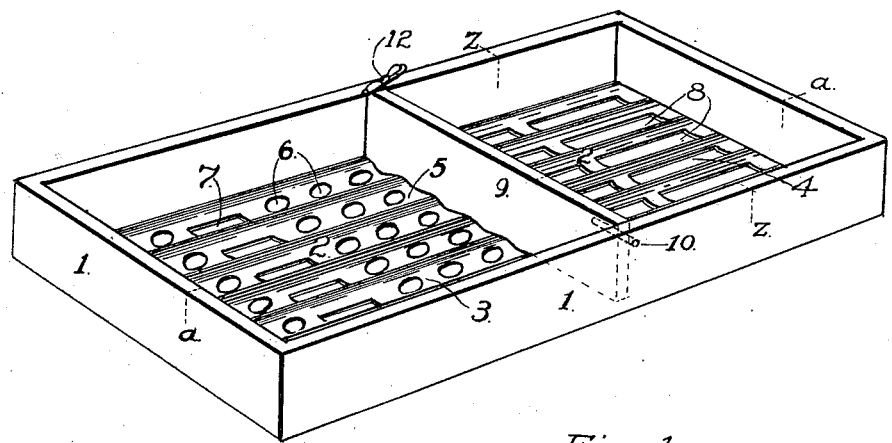
Figure 2:
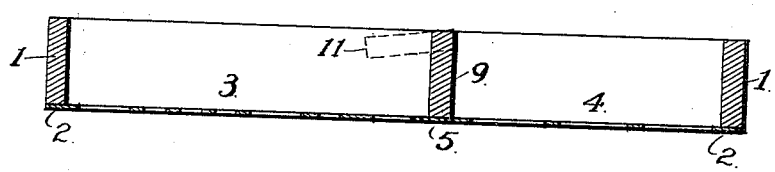
Figure 3:

The preferred manner of detail construction for carrying out the general idea of this invention is described below and shown in the accompanying sheet of drawings, in which, Figure 1 is a perspective view of this device complete and in operative position. Fig. 2 is a longitudinal vertical section on line *a—a* of Fig. 1, the partition 9 being shown raised in dotted lines 11. Fig. 3 is a cross section of the screen on line *z—z* of Fig. 1.

Similar reference numerals refer to similar parts throughout the several views.

Referring to Fig. 1, the numeral 1 denotes the screen frame of the device, which is preferably of wood, and may be of any desired shape, the same being herein shown as of oblong rectangular form. 2 denotes the screen which is preferably of corrugated sheet-metal, and is secured in any suitable manner to the under side of the frame. The screen has two compartments, 3 and 4, with a blank or imperforate space 5 between them. In the valleys of the corrugations in the compartment 3 of the screen are formed a large number of round apertures 6 approximately 5/16 of an inch in diameter or length, said dimension being commonly regarded as the minimum width of standard kernels of corn. Distributed among these round apertures, arranged either in regular order or miscellaneously, are formed a number of oblong apertures 7 approximately 9/64 of an inch in width and about 5/8 of an inch or more in length, said width being commonly regarded as the minimum thickness of standard kernels of corn. In the valleys of the corrugations in the compartment 4 of the screen are formed a large number of oblong apertures 8 approximately 7/32 of an inch in width and about 1 inch long, said width being commonly regarded as the maximum thickness of standard kernels of corn. The length of said apertures 8 is immaterial, except that they should be at least as long as the width of the larger kernels of corn. Directly over the blank space 5, and extending across the screen, is a partition or gate 9 hinged in any suitable manner to the sides of the frame, the same being herein shown as hinged on small iron pins 10 passing through the side bars of the frame and into the ends of the partition. The partition is adapted, when closed, to lie in contact with the screen on the blank space 5, thus separating the two compartments of the screen for independent action. When opened, the partition assumes the position indicated by the dotted lines 11, and the corn is thus permitted to pass from one compartment of the screen to the other. A button 12 is provided to hold the partition open or closed, however, if the partition fits closely between the side bars of the frame such provision is not needed, as the pressure of the corn against the partition in operation is very slight. As a fine apertured screen is slower in action on the corn to be graded than a coarse apertured screen, the compartment 3, which has the finer apertures, may be made somewhat larger than the compartment 4, as herein shown, which thereby tends to harmonize the action of the device as a whole.

Before explaining the operation of my device I will here state that kernels of seed corn may be divided according to size and shape, into four distinct classes. First, the abnormally thick irregular shaped kernels. Second, the large symmetrical kernels. (This class constitutes the bulk of the corn, and may be termed the standard kernels.) Third, the abnormally thin kernels, that may be as wide as the standard kernels. Fourth, the small kernels. In this class are found kernels of various shapes and sizes, ranging from those that are as long and as thick as standard kernels, but are narrower, on down to very small round-like ones.

To grade corn to thickness of kernel, the kernels must be made to enter the apertures edgewise; and to grade to width of kernel, they must be made to enter the apertures endwise. The corrugations of the screen serve as means to tilt the kernels to make them enter the apertures in the required manner. It is, however, apparent that means, other than corrugations, may be employed to serve this purpose.

My device accomplishes the separation and grading as follows;—A quantity of shelled corn is first placed on the compartment 3 of the screen and the device is then vibrated manually, causing the small and thin kernels to fall through this portion of the screen, the smallest kernels and those that may be of standard length and thickness, but narrower than is desired for planting, are eliminated through the round apertures 6, the diameter of the round apertures being such as to prevent the passage of kernels that are of a width deemed desirable for planting, and the round apertures, therefore, grade to width of kernel. The broad abnormally thin kernels are eliminated through the long narrow aperture 7. After the compartment 3 of the screen completes its action the device is held over a receptacle for the graded corn, the partition 9 is then opened, and by tilting the device the corn passes to the compartment 4 of the screen, where, by the continued vibration, the standard size kernels are made to pass through the oblong apertures 8, the width of these apertures being such as to prevent the passage of the abnormally thick and irregular shaped kernels which are intercepted by and retained on the screen, from which they are discharged. The compartment 4 of the screen thus grades to thickness of kernel, and the kernels that pass through the apertures of this compartment are graded as to thickness and as to width. The device is now inverted to discharge the abnormally large kernels and to free the screen of any kernels that may be lodged in the apertures, and after closing the partition the operation is repeated as before. As the function of the round apertures 6 is to grade the kernels as to width, this width being determined by the diameter or length of the aperture, and while a round aperture best serves this purpose, yet apertures of other forms may be employed, as for instance, oval, elliptical, or rectangular apertures may be employed provided they are practically as wide as the apertures 8 of the compartment 4, and the same length as the diameter of the round apertures. They should be practically as wide as the apertures 8 (and may be wider) in order to permit the passage of narrow kernels that are often as thick as standard kernels.

While the dimensions of the apertures herein stated are such as to produce a grade of kernels that are commonly regarded as standard or desirable to plant, yet as the minimum width or thickness of kernels that may be deemed desirable for seed is a matter of opinion and not governed by any set rule, the same also being true of kernel cells in planting machines, the dimensions here given may be varied somewhat as opinion or necessity may demand.

Other changes in detail construction could be made without departing from the spirit of the invention, as for instance, the frame may be of metal and integral with the screen, that is, the sides and ends of the screen may be turned up to form a frame. The screen may also be made of other material than sheet-metal, and another form of partition or gate than that here shown may be employed. The size and proportion of the parts may also be varied to suit the requirements when desired to use this device for screening or grading other material than corn.

From the foregoing description and explanation it may be seen that the advantages of my construction over other devices of this class are, first, simplicity. Second, small cost of manufacture, and low price at which it can be sold. Third, the working parts of the device are all open to view, and as some batches of corn require a longer time to grade than others, the operator can easily determine the amount of vibration necessary for each batch, and thereby secure better results. Fourth, as the screen is all open, very little, if any, time is lost in clearing the screen of kernels that lodge in the apertures, for a light tap, when inverted after each operation, effectually clears the screen.

While the elements shown and described are well adapted to serve the purpose for which they are intended, it is to be understood that the invention is not limited to the precise construction set forth, but includes within its purview such changes as may be made within the scope of the appended claim.

What I claim is:

A seed corn grader comprising a frame, a screen mounted in the frame, said screen having a portion provided with fine apertures and a portion provided with coarse apertures forming a continuation of the first mentioned screening surface, a partition mounted transversely in the frame at the junction of the two screen portions, and movable connections with said frame for said partition to adapt said partition for movement in opposite directions for the purpose specified.

CHARLES HUNNICUTT.

Witnesses:
 J. C. LINTON,
 D. F. McCOY.

---

Copies of this patent may be obtained for five cents each, by addressing the "Commissioner of Patents, Washington, D. C."